UNITED STATES PATENT OFFICE

2,130,523

LINEAR POLYAMIDES AND THEIR PRODUCTION

Wallace H. Carothers, Wilmington, Del., assignor to E. I. du Pont de Nemours & Company, Wilmington, Del., a corporation of Delaware No Drawing. Application January 2, 1935, Serial No. 181. Renewed September 27, 1937

20 Claims. (Cl. 260—124)

This invention relates to new compositions of matter and more particularly to high molecular weight polyamides.

This case is a continuation in part of my Patent 2,071,250.

Products obtained by the mutual reaction of certain polybasic acids and diamines have in the past been described by various investigators. These products have, for the most part, been cyclic compounds of low molecular weight. In some cases the products have been supposed to be polymeric, but they have been then completely insoluble and infusible and devoid of any known utility. These statements may be illustrated by the following citations: Fischer, Ann. 232, 227 (1886); Ber. 46, 2504 (1913); Hoffman, Ber. 5, 247 (1872); Anderlini, Ber. 27R, 403 (1894).

I have now found that by suitably selecting the polybasic acid and the diamine in the manner defined below, it is possible, by the methods there described, to obtain various polyamides which are as a class new, none of them having been described before, and these materials, moreover, include polyamides which are or can be converted into products differing from any previously known synthetic polyamides in being exceedingly valuable and useful compounds since they can generally be obtained in a condition suitable for spinning into strong, continuous, pliable, highly oriented fibers.

An object of this invention is, therefore, the manufacture of new and useful compounds. A further object is the preparation of new polyamides. A still further object is the preparation of polyamides which can be drawn into fibers.

The following discussion, in which R and R' are divalent hydrocarbon radicals, will make clear the nature of this invention. If a dibasic carboxylic acid and a diamine are heated together under such conditions as to permit amide formation, it can readily be seen that the reaction might proceed in such a way as to yield a linear polyamide.

HO₂C—R—CO₂H+NH₂—R'—NH₂→
... —NH—R'—NH—CO—R—CO—NH—
   R'—NH—CO—R—CO— ... etc.+H₂O The indicated formula represents the product as being composed of long chains built up from a series of identical units

—NH—R'—NHCO—R—CO—

This unit, derived from one molecule each of acid and diamine, may be called the structural unit. It will be convenient to refer to the number of atoms in the chain of this unit as the unit length.

The following more detailed explanation is given to indicate more exactly the meaning of the terms used in this specification. The radical of a dibasic acid is taken to mean the fragment or divalent radical remaining after the two acidic hydroxyls have been removed from the formula. Thus the radical of carbonic acid is

the radical of succinic acid is

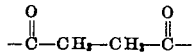

etc. The radical of a diamine is the divalent radical or fragment remaining after one hydrogen has been removed from each amino group. Thus the radical of ethylene diamine is

—NH—CH₂—CH₂—NH— the radical of pentamethylene diamine is

—NH—CH₂—CH₂—CH₂—CH₂—CH₂—NH—

The radical length is in each case the number of atoms in the chain of the radical. Thus the radical length of carbonic acid is 1, that of succinic acid is 4, that of ethylene diamine is 4, and that of pentamethylene diamine is 7. The term referred to above as the unit length is obviously the sum of radical lengths of the acid and the diamine. Conversely, the contribution which the acid makes toward the unit length of an amide is its radical length, and the contribution which the amine makes is its radical length.

As a specific illustration, reference may be made to the polyamide derived from glutaric acid and ethylene diamine. Its structural formula may in part be represented as

The structural unit is

and the unit length as indicated by the numbered atom is 9. It will be seen from the foregoing that the recurring structural units, which must have a chain length of at least 9, may be represented by the following formula,

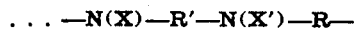

in which X and X' are hydrogen or monovalent organic radicals, preferably hydrocarbon, whose atoms adjacent to nitrogen are carbon atoms joined in turn to other atoms only by single bonds; R' is a divalent organic radical, preferably hydrocarbon, whose atoms adjacent to nitrogen are carbon atoms joined in turn to other atoms only by single bonds; and R is a divalent acyl radical. In order that the unit length exceed eight, the ingredients should be so selected that the sum of the radical lengths of —N(X)—R'—N(X')— and —R— exceeds eight.

Linear polyamides derived from aliphatic diamines plus dibasic acids and having unit lengths greater than 8 have not been described hitherto. I have found that such polyamides are in general fusible without decomposition, and/or soluble, and these properties make it possible to obtain such polyamides in a condition suitable for spinning into fibers. Thus, although ethylene succinamide is both insoluble and infusible, the polyamide which is derived from ethylene diamine and glutaric acid and which has a unit length of 9 melts at about 298° C. and dissolves in hot formamide (see Example II) while the polyamide which is derived from pentamethylene diamine and sebacic acid and has a unit length of 17 melts at about 195° C.

The process of this invention then consists in the first place in reacting an aliphatic diamine with a dibasic carboxylic acid or an amide-forming derivative of the acid, the acid and the amine being so chosen that the unit length is greater than 8. By an amide-forming derivative of an acid I mean an ester, an anhydride, or an acyl halide of the acid. Examples of diamines and acids suitable for this purpose are given below in Table I in which R represents an alkyl radical:

I may also use diamines of the above types in which one of the hydrogens attached to either or both of the nitrogen atoms is replaced by a hydrocarbon radical.

For the purposes of this invention, any of these diamines can be combined with any of the listed acids provided only that the sum of the indicated contributions which each makes to the unit length is not less than 9. Other dibasic acids and aliphatic diamines than those listed above may also be used subject to this same limitation. By an aliphatic diamine I mean a diamine in which the nitrogens are attached to carbons which are in turn connected to other atoms only by single bonds.

The methods of operating the processes of this invention are described below and are more fully illustrated in the numbered examples which follow.

A diamine is reacted with a dibasic carboxylic acid, an alkyl ester of a dibasic carboxylic acid, an aryl ester of a dibasic carboxylic acid, or a chloride of a dibasic carboxylic acid. The preferred methods involve the use of the acid or its alkyl or aryl ester, and the most effective operating conditions will depend in part on the choice of the reactants used. The acid or its ester may be illustrated by the general formula AOOCRCOOA where A stands for hydrogen or a hydrocarbon radical and R represents a divalent hydrocarbon radical. A primary step in the reaction of this compound with the diamine $NH_2R'NH_2$ might be indicated by the equation, in

TABLE I

| Radical length | Dibasic carboxylic acids |
|---|---|
| 1 | HOCOOH carbonic. |
| 2 | $HO_2CCO_2H$ oxalic. |
| 3 | $HO_2CCH_2CO_2H$ malonic. |
| 3 | $HO_2CCH(CH_3)CO_2H$ methyl malonic. |
| 3 | $HO_2CCHRCO_2H$ substituted malonic. |
| 4 | $HO_2CCH_2CH_2CO_2H$ succinic. |
| 5 | $HO_2CCH_2CH_2CH_2CO_2H$ glutaric. |
| 5 | $HO_2CCH_2CHRCH_2CO_2H$ substituted glutaric. |
| 6 | $HO_2C(CH_2)_4CO_2H$ adipic. |
| 7 | $HO_2C(CH_2)_5CO_2H$ pimelic. |
| 8 | $HO_2C(CH_2)_6CO_2H$ suberic. |
| 9 | $HO_2C(CH_2)_7CO_2H$ azelaic. |
| 10 | $HO_2C(CH_2)_8CO_2H$ sebacic. |
| 13 | $HO_2C(CH_2)_{11}CO_2H$ brassylic. |
| 14 | $HO_2C(CH_2)_{12}CO_2H$ tetradecanedioic. |
| 18 | $HO_2C(CH_2)_{16}CO_2H$ octadecanedioic. |
| 8 | $HO_2CCH_2C_6H_4CH_2CO_2H$ p-phenylene diacetic. |
| 6 | $HO_2CCH\underset{CH_2CH_2}{\overset{CH_2CH_2}{\diagup\diagdown}}CHCO_2H$ hexahydroterephthalic. |
| 5 | $HO_2C-CH\underset{CH_2}{\overset{CH_2-CH_2}{\diagup\diagdown}}CHCO_2H$ cyclopentamethylene dicarboxylic. |

| Radical length | Diamines |
|---|---|
| 4 | $NH_2CH_2CH_2NH_2$ ethylene. |
| 4 | $NH_2CH_2CHCH_3NH_2$ propylene. |
| 4 | $CH_3CH_2—CHNH_2CH_2NH_2$ butylene. |
| 5 | $CH_3CHNH_2CH_2CH_2NH_2$ 1,3-diaminobutane. |
| 5 | $NH_2(CH_2)_3NH_2$ trimethylene. |
| 6 | $NH_2(CH_2)_4NH_2$ tetramethylene. |
| 7 | $NH_2(CH_2)_5NH_2$ pentamethylene. |
| 8 | $NH_2(CH_2)_6NH_2$ hexamethylene. |
| 12 | $NH_2(CH_2)_{10}NH_2$ decamethylene. |
| 15 | $NH_2(CH_2)_{13}NH_2$ tridecamethylene. |
| 20 | $NH_2(CH_2)_{18}NH_2$ octadecamethylene. |
| 8 | $NH_2CH_2C_6H_4CH_2NH_2$ p-xylylene. |
| 6 | $NH_2CH\underset{CH_2-CH_2}{\overset{CH_2-CH_2}{\diagup\diagdown}}CHNH_2$ cyclohexylene. | which R and R' are divalent hydrocarbon radicals:

NH₂R'NH₂+AOOCRCOOA→
NH₂R'NHCORCOOA+AOH

The progress of the reaction depends upon the elimination of the hydroxyl compound (water, alcohol, or phenol). This primary product is capable in a second step of reacting with itself with the elimination of AOH yielding another product molecule twice as long, or, since one end of the primary molecule bears an NH₂ group, it may react with another molecule of AOOCRCOOA, while the COOA end of the primary molecule may react with another molecule of the amine. It is evident then that by a series of steps the length of the product polyamide molecule will gradually increase and the same reactants will furnish structurally similar polyamide molecules of different lengths depending upon the extent to which the reaction has been carried. In practice, it is in general not possible to distinguish or isolate the possible separate steps (except perhaps the very earliest ones); nevertheless, the average length of the product molecules will in fact depend upon the degree of completeness of the reaction, and if polyamides of very high molecular weight are desired, it is necessary to adopt such conditions of time, temperature, pressure, and catalysis as will insure a relatively high degree of completeness of reaction.

Another factor of considerable importance is the ratio of acid or ester to amine initially and at various stages of the reaction. If a very large excess of diamine is used, the product will consist preponderantly of

NH₂R'NHCORCONHR'NH₂

Since this material contains only one structural unit, it must be regarded as a monomeric, not a polymeric, product. Similarly, if a large excess of acid is used, the preponderant product will be a short molecule bearing acid groups at each end. If a relatively small excess of diamine is used, the product may consist of relatively long polymeric molecules bearing amino groups at each end. If the product molecule is exceedingly long, it must, of course, be derived from almost exactly equivalent amounts of acid and amine. This does not mean, however, in practice that it will be necessary to have the amine and acid (or ester) present in exactly equivalent amount initially in order finally to obtain molecules of very great length. A part of the excess diamine or acid may be eliminated by volatilization or otherwise during the course of the reaction so that the ratio of the radicals derived from the two reactants is almost exactly equivalent in the final product. In practice, it is frequently found advantageous to use initially an excess of one of the reactants even when high molecular weight polymers suitable for spinning are desired. Thus, as is shown in Example IVe an excess of dibasic acid amounting to as much as 5% may be used in producing a spinnable polymer from pentamethylene diamine and sebacic acid. And again, as is shown in Example IVd, a 5% excess of the diamine may be used in preparing polymer from the same materials. It may be observed that the relative excess of diamine or dibasic acid will, in general, determine the nature of the end groups on the final polymer molecule and these may in turn partially condition the physical behavior of the polymer.

Reaction between diamines and the alkyl esters of dibasic acids is generally very slow at ordinary temperatures. Hence, in bringing about the condensation of a diamine and such an ester, it is desirable to use elevated temperatures. In general, at the beginning of the reaction, it will be desirable to use temperatures above 120° C, and customarily in the neighborhood of 160 to 180° C. At these temperatures, the ester and the diamine will have appreciable and, in general, different volatilities. Hence, in order to avoid change in the composition of the reaction mixture, it is necessary to operate under a reflux condenser or in a closed vessel under pressure. As the reaction progresses, the polymer initially formed separates from the reaction mixture since it is relatively insoluble therein. Ultimately, in order to obtain a complete and homogeneous reaction mixture, it is desirable to increase the temperature of the reaction mixture so that it becomes and remains molten and homogeneous. Thus, the final temperature will usually lie above 200° and may lie as high as 280 to 290° C. The progress of the reaction is accompanied by the liberation of alcohol, and, in accordance with the principles of mass action, the reaction may be hastened toward completion by elimination (e. g., through volatilization) of the alcohol formed. This may be done continuously through the use of suitably cooled columns which permit the continuous fractional elimination of the alcohol while other components of the reaction mixture are continuously returned, or the operation may be so conducted that the heating occurs alternately with the vessel closed and then opened (or evacuated). In general, it is preferable to conduct the first part of the heating in a closed vessel under pressure, and then when the reactants have been largely fixed by chemical combination, the vessel may be opened (or evacuated) and heating continued so as to remove the alcohol as completely as possible and force the reaction toward completion.

Instead of using the alkyl esters of dibasic acids in the condensation with diamines, the aryl esters may be used. Thus, in preparing a polyamide derived from pentamethylene diamine and sebacic acid, diphenyl sebacate may be used as a source of the sebacic acid radical. The diphenyl ester of sebacic acid is somewhat more costly than the diethyl ester, but it has the advantage of reacting much more rapidly. It tends also to react very much more completely. On this account, complete conversion to polyamide of high molecular weight occurs under milder conditions, and there is less necessity for a complete and drastic removal of the liberated phenol. Moreover, the phenol has a considerable softening or solvent action on the polyamide formed, and it aids in homogenizing the reaction mixture. In certain cases, polyamides suitable for spinning can be formed merely by heating the phenyl ester of the dibasic acid and the diamine in a closed vessel, e. g., at 200° C., without the necessity of removing the liberated phenol as it is formed in the last stages of the reaction to force the reaction toward completion.

Although the formation of amides and substituted amides from the corresponding ammonium salts by the elimination of water is in general a reversible reaction of such a type that the equilibrium under most conditions is rather unfavorable to complete reaction, I have found, nevertheless, that the formation of polyamides from diamines and dibasic acids of the types indicated above takes place quite readily, and that the reaction is sufficiently complete under relatively simple conditions as to permit the formation of polymers having molecular weights sufficiently high as to be very suitable for producing synthetic silk of excellent quality. The conditions of reaction are illustrated in detail for certain specific cases in numbered Examples IV$a$–$h$ below, and the following discussion will indicate in a more general way certain factors concerning the operational procedure. When equivalent amounts of a diamine and a dibasic acid are mixed and brought into sufficiently intimate contact, a salt is immediately formed. Such salts are generally solids and since their tendency to dissociate into their components is relatively low, both the acid and the amine are fixed. The mixture can, therefore, be subjected immediately to heat in an open vessel without danger of losing amine (or acid) and so disturbing the balance in the proportion of reactants. In general, however, a more rapid progress is attained if the mixture of amine and acid (or the salt) is immediately raised to a temperature close to that finally employed in completing the reaction, and, under these conditions, it is preferable to use a closed vessel or one provided with a reflux condenser. Thus, for example, the mixture of diamine and acid may be heated in a sealed vessel by placing the vessel in a bath kept at about 220° C. The mixture which is at first a pasty crystalline solid completely liquefies as its temperature rises from 100° to 200° C. After being heated at 220° C. for about two hours, the vessel may be opened and then heated further at 200° C. for two hours under a vacuum of 1 mm. of mercury.

The required temperatures indicated above will vary somewhat with the nature of the amine and the acid from which the polyamide is derived. In the absence of a solvent or medium, the final stage of the reaction should preferably be carried out at a temperature above the melting point of the polyamide. Thus, in general, the final temperature will be above 180° C., and it may lie as high as 270–290° C. The time and pressure required in the final stage to produce a polymer suitable for spinning will depend in part on the size of the batch and in part on the amount of surface it presents. Pressures as low as 1 mm. are by no means necessary. As is shown in Example IV$g$, the final stage of the reaction can be carried out quite successfully at atmospheric pressure since even under these conditions at 230° C. the distillation of water is sufficiently rapid and complete. The final stages of the reaction may also be hastened by stirring the reaction mixture or by bubbling through it or passing over it an inert gas such as nitrogen (cf. Example IV$h$). A factor that must be kept in mind, however, is that the final reaction mass conducts heat very slowly and if local cooling takes place in the interior of the mass, solid particles or lumps will tend to separate causing incompete reaction. For this reason, if a gas is passed through the reaction mixture it should preferably be preheated.

The polyamides of this invention compared with most organic compounds are unusually resistant to oxidation. Nevertheless, at the high temperatures used in their preparation (e. g., 220° C.) they show a strong tendency to become discolored in the presence of air. For this reason, it is desirable to exclude air or to limit the access of air during their preparation. This may be done by the usual methods, e. g., by operating in a closed vessel during the early stages of the reaction, or, if an open vessel is used, by providing a stream of inert gas. One of the principal advantages of operating under diminished pressure in the later stages of the reaction also is the fact that this greatly cuts down on the incidence of air. It is helpful in some cases to add antioxidants to the reaction mixture, especially antioxidants such as syringic acid that show very little inherent tendency to discolor.

In general, no added catalysts are required in the above described processes of the present invention. It should be mentioned, however, that the surface of the reaction vessel (e. g., glass) appears to exercise a certain degree of catalytic function in many cases. The use of added catalysts may also confer additional advantages. Examples of such materials are inorganic materials of alkaline reaction such as oxides and carbonates, and acidic materials such as halogen salts of polyvalent metals.

Polyamides of this invention may be prepared by the action of the chloride of a dibasic acid on a diamine. Reaction then occurs very rapidly, and it is preferably moderated by the use of an inert diluent such as benzene. Additionally basic substances or acid acceptors may be added to the reaction mixture to absorb the liberated hydrogen chloride. Such bases may be caustic alkalies or carbonates, alkaline earth oxides or carbonates, or tertiary organic bases such as pyridine.

Polyamides formed in this manner are frequently of relatively low molecular weight and for that reason incapable of forming fibers. Such polyamides can generally be increased in molecular weight and made suitable as fiber-forming materials by heating them at an elevated temperature, e. g., at 200–250° under conditions that permit the rapid removal of readily volatile material.

From the above description it will be clear that the polyamide product of this invention derived from a given diamine and a given dibasic acid will in general comprise a series of individuals of closely similar structure. If the structural unit is represented by —$u$—, the general formula of the polymer may be represented by $p$—$(u)_x$—$q$, where $x$ is an integer and $p$ and $q$ are the univalent terminal groups (or are absent if the molecule is cyclic). In general it will not be possible to isolate separate individuals corresponding to single values of $x$ except where $x$ is very low (e. g., 2). The product will ordinarily be a mixture of molecules of the above indicated structure in which various values of $x$ are represented. The average value of $x$ obviously determines the average molecular weight of the polymer.

The average value of $x$ is subject to deliberate control within certain limits: the further the reaction has progressed the higher the average value of $x$ will be. The properties of a given polyamide will therefore vary over a considerable range, depending upon its molecular weight (and in part on the nature of its terminal groups). The average molecular weights of the polymers of this invention are very difficult to determine on account of their limited solubility in suitable solvents. In special cases, however, chemical methods may be applied to the determination of molecular weights and illustrative data bearing on this point are presented in Example I. A precise knowledge of average molecular weights is, however, not important for the purposes of this invention. In a rough way it may be said that two stages or degrees of polymerization exist:

Low polymers whose molecular weights probably lie in the neighborhood of 1,000 to 4,000, and high polymers whose molecular weights probably lie in the neighborhood of 7,000 to 20,000. Practically the most important distinction between the two types is that the high polymers are readily spun into strong, continuous, pliable, permanently oriented fibers, while this property is lacking in the low polymers such as that of Example I given below. The low polymers, however, are useful for other purposes than conversion into polyamides particularly suitable for fiber formation, in as much as the polymers of this invention, as disclosed in the above mentioned Patent 2,071,250, may be used as ingredients in coating and molding compositions.

Two of the most characteristic properties of the polyamides of this invention are their high melting points and low solubilities. Although those products derived from highly substituted dibasic acids or diamines (e. g., substituted on the methylene chain by alkyl or aryl groups) and those derived from secondary diamines in many cases are at ordinary temperatures only very viscous liquids; those derived from the simpler types of diamines are almost invariably opaque solids that melt or become transparent at a fairly definite temperature. Below their melting points the polyamides of this invention when examined by X-rays generally furnish sharp X-ray crystalline powder diffraction patterns. Typical melting points are shown in the following table (II).

TABLE II

*Approximate melting points and densities of some polyamides*

| Polyamide derived from— | M. P. °C. | Density |
|---|---|---|
| Propylene diamine and sebacic acid | 220 | |
| Pentamethylene diamine and sebacic acid | 195 | 1.08 |
| Pentamethylene diamine and dodecamethylene dicarboxylic acid | 170 | 1.05 |
| Pentamethylene diamine and hexadecamethylene dicarboxylic acid | 167 | 1.04 |
| Ethylene diamine and hexadecamethylene dicarboxylic acid | 207 | |

The melting points are dependent to some extent upon the heating schedule used and the conditions of thermal contact, but when carried out by the same operator under the same conditions they are fairly sharp and reproducible. The melting points given in the table were determined by placing fine particles of the polyamide on a heated metal block in the presence of air and noting the temperature of fusion or melting. Moreover, the melting points depend very little upon the molecular weight of the polymers; that is, the low polymers and the high polymers have generally approximately the same melting point. On the other hand, the melting points are considerably affected by the nature of the acid and the diamine used in their preparation. In particular melting points generally diminish with increasing unit length and increasing degree of substitution on the hydrocarbon chain. Increased solubility also runs in the same direction, but is again not greatly affected by the molecular weight. In general the polyamides of this invention can be dissolved in hot glacial acetic acid or in phenol. They are quite insoluble in most of the other usual types of organic solvents. In the finely divided state they are attacked by strong mineral acids such as strong hydrochloric or sulfuric acid and on heating with such acids they are quantitatively hydrolyzed to the dibasic acids and diamines from which they are derived. They are resistant to attack by strong caustic alkalies but these agencies also will finally hydrolyze them to the diamines and dibasic acids.

The most obvious distinction between the low polymers and the high polymers is that the former when molten are relatively much less viscous. The high polymers even at temperatures above 200° C. are scarcely capable of flowing. These polymers also dissolve more slowly than the low polymers and solution is preceded by swelling. As already mentioned, the high polymers can be spun into continuous highly oriented filaments whereas the low polymers cannot. In general the low polymers can be converted into high polymers by a continuation of the reaction by which the low polymers were formed or, for example, by further heating at higher temperature under conditions that permit the rapid removal of any readily volatile products. The necessary conditions vary according to the particular case as is indicated in the discussion of various factors presented above, but in practice the conversion to high polymer is easily tested for merely by touching the surface of the molten polymer with a rod and drawing the rod away. If high polymer is present a continuous filament of considerable strength and pliability is readily formed. This simple test is easily used to control the completion of the reaction. The length of the heat treatment necessary to obtain products of optimum utility for spinning must be determined for each polymer. If the heat treatment is continued after this optimum has been reached, inferior products are often obtained.

The high molecular weight polyamides of this invention are all capable of being spun into continuous filaments. The spinning may be carried out by the several methods referred to below. That is, the polyamide may be dissolved in a suitable solvent and the solution extruded through orifices into a coagulating bath, the resulting filament being continuously collected on a suitably revolving drum or spindle. Or, the extruded solution may be passed through a heated chamber where the solvent is removed by evaporation. The properties of the polyamides of this invention also make it possible to spin the molten material directly without the addition of any solvent or plasticizer. For this purpose a mass of the molten polymer may be touched with a rod. Upon drawing the rod away a filament is formed. The filament may be caught on a moving drum or reel and in this manner a continuous filament may be drawn from the molten mass until the latter is exhausted. The cross-section of the filaments thus obtained can be regulated by controlling the temperature of the molten mass and the rate of reeling. The higher the temperature and the more rapid the rate of reeling, the finer will be the filament.

Continuous filaments may also be produced by extruding the molten polyamide through an orifice and continuously collecting the extruded filament on a rotating drum. The fineness of the filaments may be controlled by controlling the temperature of the molten polymer, the amount of pressure applied, the size of the orifice, and the rate of reeling. The properties of the polyamides' high molecular weight of this invention make it possible to obtain exceedingly fine filaments, as fine as 0.2 denier or less.

A remarkable characteristic of filaments of the high molecular weight polyamides of this invention is their ability to accept a very high degree of permanent orientation under stress. Filaments obtained by spinning the polyamides under such conditions that very little stress is applied very closely resemble the polymer from which they are drawn. In particular, when examined by X-rays they furnish X-ray crystalline powder diffraction patterns, but by the application of moderate stress at ordinary temperature these filaments can be instantly elongated or cold-drawn as much as 200–700%. This cold drawing is accompanied by a progressive increase in tensile strength until a definite limit is reached beyond which the application of additional stress causes the fiber to break. The cold drawn fibers remain permanently extended, they are much stronger than the material from which they are drawn, more pliable and elastic, and when examined by X-rays they furnish a sharp fiber diffraction pattern. They also exhibit strong birefringence and parallel extinction when observed under crossed Nicols' prisms. This evidence of fiber orientation shows that the cold drawn filaments are true fibers.

In practice, the formation of continuous oriented fibers from the filaments of this invention is easily conducted as an integral part of the spinning operation. Thus the extruded filaments as they are collected may be transferred continuously to a second drum driven at a higher rate of speed, so as to provide any desired degree of stretching or cold drawing. Or friction devices may be inserted between the two drums to provide the necessary stretch. It may be observed that this process of cold drawing differs from the stretch-spinning known to the artificial fiber art in that it may be carried out very rapidly and completely in the total absence of any solvent or plasticizer The synthetic fibers of the foregoing disclosure are unique in that the materials are synthesized from low molecular weight, monomeric, non-fibrous materials. This is quite different from the preparation of fibrous materials such as cellulose acetate, ethyl cellulose, etc., in which high molecular weight (polymeric) fibrous materials synthesized by nature are used as starting materials.

The properties of the fibers of this invention vary considerably with the nature of the reactants used in preparing the polyamides, and with the conditions of reaction and spinning. General characteristics illustrated in Example IX are high tenacity, high orientation, complete lack of sensitivity toward conditions of humidity, exceptionally good elastic recovery, extraordinary resistance to solvents and chemical agents, and exceptionally good aging characteristics in air even at elevated temperatures. These fibers also have a strong affinity for dyes; they can be dyed rapidly, permanently and directly, with the dyes ordinarily used for wool and silk.

The following examples are illustrative of the methods which may be used in the practice of my invention:

EXAMPLE I

*Polyamide from N,N'-dimethylpentamethylene diamine and phenyl succinate (unit length=11)*

Nineteen parts (0.146 mole) of dimethylpentamethylene diamine, $CH_3NH(CH_2)_5NHCH_3$, was placed in a Claisen flask and 49 parts (0.182 mole) of diphenyl succinate was added. A spontaneous reaction occurred with a marked evolution of heat. The mixture was heated at 120° C. for 1.5 hours and then at 170–190° C. for 3.5 hours. The pressure was then reduced in order to distill off the phenol formed in the reaction. The residue (polyamide) was hydrolyzed by refluxing with 10% sulfuric acid and the phenol liberated from the polymer, along with succinic acid and dimethylpentamethylene diamine sulfate, was estimated by titration with bromate solution. Samples of polyamide weighing 0.3673 g. and 0.4354 g. gave on hydrolysis 0.01686 g. and 0.02096 g. of phenol, respectively. Since an excess of diphenyl succinate was used in the preparation of the polyamide, it may be presumed that the ends of the molecules bear phenyl ester groups. The calculated molecular weight of the polyamide on the basis of the observed phenol content then is 4052 and 3913.

EXAMPLE II

*Polyamide from ethylene diamine and ethyl glutarate (unit length=9)*

Chemically equivalent amounts of ethylene diamine and diethyl glutarate were heated in a sealed vessel at 180–200° C. for 5 hours. The polymeric ethylene glutaramide formed in this way was a white mass. It was washed with hot alcohol, dilute hydrochloric acid, water, alcohol, and ether. It was insoluble in most of the common organic solvents but dissolved readily in hot formamide. In this respect it differed from the similar product derived from ethylene diamine and ethyl succinate. Moreover, when dusted on a heated copper block it melted at 298° C. Analysis showed that it had the composition of the polyamide.

Anal. Calcd. for $(C_7H_{12}O_2N_2)_x$: C, 53.85; H, 7.69; N, 17.95. Found: C, 53.82, 53.79; H, 8.09, 8.19; N, 18.50, 18.66.

EXAMPLE III

*Polyamide from pentamethylene diamine and ethyl sebacate (unit length=17)*

Exactly chemically equivalent amounts of pentamethylene diamine and ethyl sebacate were heated in a closed glass vessel for 16 hours at 100–170° C. The vessel was then opened and the heating continued at 120–130° C. to remove the major portion of the alcohol formed in the reaction mixture. The solid product (low polymer) was again heated with the vessel closed at 210–220° C. for several hours to promote further condensation. At this temperature it became molten. Heating was then continued for 8 hours more at 240° C. under a vacuum of 1 mm. of mercury. The resulting highly polymeric pentamethylene sebacamide when cold was an opaque, hard solid. It melted at 190–195° C. Its density was about 1.08. When molten it was exceedingly viscous. When the molten polymer was touched with a rod and the rod drawn away, a continuous filament resembling silk was produced.

Example IV

*Polyamide from pentamethylene diamine and sebacic acid (unit length=17)*

(a) Chemically equivalent amounts of pentamethylene diamine and sebacic acid were heated in a closed glass vessel by means of a bath at 220–230° C. for one hour whereby a low molecular weight polymer was obtained. The pressure in the vessel was then reduced to 1 mm. and heating of the low molecular weight polyamide was continued for 3 hours at 230–240° C. The homogeneous reaction mixture gradually became more viscous as the molecular weight of the polyamide increased and at the end of the indicated period the molten mass of polymeric pentamethylene sebacamide was just barely capable of flowing. It was readily spun into continuous filaments which, however, were somewhat brittle and weak. When the heating was continued for an additional period of 5 hours under the indicated temperature and pressure, the product gave filaments of improved strength.

(b) Chemically equivalent amounts of pentamethylene diamine and sebacic acid were heated for 2 hours at 220-240° C. in a closed vessel. The low polymer thus obtained was heated for one hour at 230-240° C. under a pressure of 1 mm. The highly polymeric pentamethylene sebacamide thus obtained readily yielded continuous filaments of good strength. On further heating for one hour at the same pressure and temperature the polymer yielded fibers of still higher strength.

(c) Chemically equivalent amounts of pentamethylene diamine and sebacic acid were heated at 200° C. for 3 hours in a closed vessel. The vessel was then evacuated and heating was continued for 2 hours more at 230-240° C. under a pressure of 1 mm. of mercury. The polyamide thus produced had excellent fiber forming properties.

(d) Twenty-eight and nine-tenths grams of sebacic acid and 15.4 g. (5% excess) of pentamethylene diamine were heated for 2 hours in a closed glass vessel at 220-230° C. The vessel was then evacuated and heating was continued for 2 hours more at 220-230° C. at 1 mm. The resulting polyamide readily gave fibers of exceptional strength and pliability. The spinning qualities of this polymer were superior to those of similar polymer prepared in exactly the same manner using exactly equivalent amounts of the acid and the diamine.

(e) Five grams of pentamethylene diamine and 10.39 g. (5% excess) of sebacic acid were heated for two hours in a closed glass vessel at 230-240° C. The vessel was then evacuated and heating was continued further for one hour at a pressure of 1 mm. of mercury. The resulting polyamide was readily spun into continuous fibers that showed good strength.

(f) Chemically equivalent amounts of sebacic acid and pentamethylene diamine together with about 0.1% stannous chloride were heated in a closed glass vessel for 2 hours at 230-240° C. The vessel was then opened to permit the removal fo water by distillation and heating was continued at atmospheric pressure for one hour. The resulting polyamide gave fibers that showed good strength.

(g) Chemically equivalent amounts of sebacic acid and pentamethylene diamine were heated at 230-240° C. for 2 hours in a closed glass vessel. The vessel was then opened to permit the removal of water by distillation and heating was continued for one hour. The resulting polymer readily yielded fibers of good strength.

(h) Chemically equivalent amounts of sebacic acid and pentamethylene diamine were heated at 200° C. at atmospheric pressure in a glass vessel provided with a reflux condenser. The condenser was then removed to permit the distillation of water and heating was continued at 230-240° C. for 6 hours while a slow stream of nitrogen was passed over the surface of the mixture. The resulting polymeric pentamethylene sebacamide was readily spun into continuous fibers of good strength.

EXAMPLE V

*Polyamide from pentamethylene diamine and ethyl hexadecamethylene dicarboxylate (unit length=25)*

Chemically equivalent amounts of pentamethylene diamine and $C_2H_5O_2C(CH_2)_{16}CO_2C_2H_5$ were heated in a closed glass vessel at 100-180° C. for 23 hours. The vessel was then opened and heating was continued at 170-180° C. for 3 hours to permit the distillation of alcohol. The vessel was closed and heating was continued further for 8 hours at 230-240° C. Finally, the vessel was evacuated and heating was continued for 8 hours at 230-240° C. under a pressure of 1 mm. of mercury. During the progress of the reaction, the reaction mixture became progressively more viscous until finally the product was barely capable of flowing at 230-240° C. This material, highly polymeric pentamethylene octadecanediamide, was obtained on cooling as a slightly brownish, opaque, hard solid which suddenly became transparent at 167° C. It was readily transformed into fibers by the method described in Example IX.

EXAMPLE VI

*Polyamide from pentamethylene diamine and ethyl dodecamethylene dicarboxylate (unit length=21)*

Chemically equivalent amounts of pentamethylene diamine and $C_2H_5O_2C(CH_2)_{12}CO_2C_2H_5$ were heated in a closed glass vessel for 16 hours at 200-240° C. The vessel was then evacuated and heating was continued for 8 hours at 240° C. under a vacuum of 1 mm. of mercury. During the course of the reaction, the reaction mixture became progressively more viscous until finally it was barely capable of flowing at 240° C. This highly polymeric pentamethylene tetradecanediamide was obtained in quantitative yield. It was a hard, opaque, amber-colored solid which melted at 170° C. It readily yielded strong, highly oriented fibers.

EXAMPLE VII

*Polyamide from propylene diamine and ethyl sebacate (unit length=14)*

Chemically equivalent amounts of propylene diamine ($CH_3CHNH_2CH_2NH_2$) and ethyl sebacate were heated for 20 hours in a closed glass vessel at 100-180° C. The vessel was opened and heating was continued for 0.5 hour at 80-120° C. to remove most of the ethanol. During the progress of the reaction, a white solid gradually accumulated in the reaction mixture. The vessel was now closed and heating was continued further for 6 hours at 280° C. At this temperature, the reaction mixture was molten, and it gradually became increasingly viscous. The vessel was finally evacuated and heating was continued for 16 hours at 275-280° C. under a pressure of 1 mm. The polymeric propylene sebacamide thus obtained was a hard, opaque solid which melted at 218-220° C.

EXAMPLE VIII

*Polyamide from ethylene diamine and ethyl hexadecamethylene dicarboxylate (unit length =22)*

Chemically equivalent amounts of ethylene diamine and $C_2H_5O_2C(CH_2)_{16}CO_2C_2H_5$ were heated in a closed glass vessel at 200° C. for 16 hours. The vessel was then evacuated and heating was continued for 15 hours at 250-260° C. under a pressure of 1 mm. The reaction mixture gradually became more viscous until at the end it was barely capable of flowing at 250° C. This product which was obtained in quantitative yield was highly polymeric ethylene octadecanediamide. It was hard, opaque solid which had a density of 1.04 and melted at 207° C. It was readily spun into continuous, strong, pliable, highly oriented fibers.

EXAMPLE IX

*Spinning of polymeric pentamethylene sebacamide*

Fibers were spun from the polyamide of Example III by the following procedure. A sample of the highly polymeric pentamethylene sebacamide was heated at 213–215° C. in a small cylindrical metal vessel surrounded by an electrically heated metal block and provided at the bottom with an orifice 0.47 mm. in diameter. The top of the vessel was connected with a tube through which nitrogen was passed under a gauge pressure of 10 lbs. The extruded filament was collected on a motor driven drum having a peripheral speed of 80 ft. per minute and was continuously transferred to and collected on a second drum having a peripheral speed of 190 ft. per minute. The extent of the cold drawing thus produced was 138%. The resulting fiber was lustrous and silky in appearance. It showed strong birefringence with parallel extinction under crossed Nicols' prisms and when examined by X-rays it furnished a sharp fiber diffraction pattern while the same material before spinning furnished only a powder diffraction pattern. When further stress was applied to these fibers further cold drawing occurred up to a total elongation of about 336%. Physical data on the completely cold drawn fibers were: denier at break, 2.3 g.; tensile at break, 16.3 kg./mm.$^2$ or 1.68 g. per denier. The elastic recovery of these fibers under moderate elongations or stresses was very remarkable and in this respect it was much superior to existing artificial silks. In their physical behavior these fibers are almost completely insensitive to moisture and indeed they show scarcely any tendency to absorb hygroscopic moisture. The fibers are completely resistant to the common organic solvents except such materials as hot acetic acid, phenol, or hot formamide, and they can for example be immersed in boiling toluene for a week without any noticeable effect. They are also very resistant to the effects of air and high temperature. They show no signs of tendering after storage for a month in air at 110° C.

EXAMPLE X

*Spinning of polymeric pentamethylene sebacamide*

A polymer prepared as indicated in Example IV*d* was spun in the manner indicated in Example IX. The temperature of the melt was 215–220° C.; the spinning rate (peripheral speed of first drum) was 70 ft. a minute, and the rate of cold drawing (peripheral speed of the second drum) was 225 ft. a minute. Complete cold drawing of the filament involved a total extension of 444%. The resulting silk-like fiber had a denier at break of 0.65 g. and a tenacity of 3.38 g. per denier or 33 kg. per mm.$^2$ A sample of fiber having a denier of 1.1 g. prepared from the same polyamide was dried by heating at 110° C. for 16 hours and immediately weighed. It was then stored at 25° C. at 50% relative humidity for 5 hours and again weighed. The weights were 1.1184 g. and 1.1272 g., respectively, indicating that the fibers had absorbed 0.79% moisture. Viscose rayon fibers stored under comparable conditions absorbed about 8% moisture. The polyamide also had a higher ratio of wet to dry strength than the rayon.

EXAMPLE XI

*Spinning of polymeric pentamethylene tetradecanediamide*

A high polymer prepared as indicated in Example VI was spun in the manner described in Example IX, the exact condition being as follows: temperature of melt, 195–200° C.; pressure, 4 lbs.; diameter of orifice, 0.47 mm.; spinning rate (peripheral speed of first drum), 67 ft. per minute; and rate of cold drawing (peripheral speed of the second drum), 180 ft. per minute. Complete cold drawing of the filament involved a total extension of 242%. The resulting silk-like fiber had a denier of 6.5 g. and a density of 1.052. The fiber had a denier at break of 5.1 g. and a tenacity of 1.2 g. per denier.

The preparation of polyamides is not limited to the use of the diamines cited in the foregoing examples. Primary amines react most readily but secondary amines are also operative. Tertiary amines, i. e., amines having no reactive hydrogens, cannot be used, however. In the case of secondary amines it is generally advantageous to use the phenyl esters of the dibasic acids. Among other amines which may be used in addition to those cited in the examples and in Table I are the following: 1,4-diaminopentane, 2,5-diaminohexane, 2,2'-diaminodiethyl ether, and 1,3-diaminocyclohexane. Mixtures of diamines may be used.

The polyamides can be prepared from all dibasic acids which are sufficiently stable at the reaction temperature. It is generally more desirable to use the free acid or its diester, but the anhydride, chloride, or half ester may also be used. Numerous examples of dicarboxylic acids which may be used as such or as some amine reactive or amide-forming derivative thereof have already been mentioned, but my invention is not restricted to the use of these particular acids. I may prepare mixed polyamides by using a mixture of dibasic acids and/or diamines.

The low molecular weight or non-fiber-forming polyamides are in most instances converted into highly polymeric products having fiber-forming qualities by heating as herein described. In the case of some of my new condensation products it may be advantageous to apply the principles of molecular distillation described in my above identified application in order further to increase the molecular weight to the point where the most satisfactory fiber formation can be effected. The various other methods described in that application for bringing about the irreversible absorption of the volatile reaction products may also be applied where desirable to the manufacture of the polyamides described herein.

As indicated above, this invention affords a simple method for the preparation of high melting, relatively insoluble products. An important feature of my invention is the production of condensation products which are capable of being drawn into strong, flexible fibers which in some respects, especially in their elastic properties and high ratio of wet strength to dry strength, are superior to artificial fibers prepared by the methods of the prior art. The polyamides of the present invention are additionally useful as ingredients in molding, coating, and impregnating compositions.

It is to be understood that the claims herein are directed to polyamides having recurring structural units of chain length exceeding eight regardless of whether the polyamides are of the high molecular weight variety from which useful fibers may be directly formed, or whether the polyamides are of the low molecular weight variety incapable of being drawn directly into fibers but useful because of other properties such as fusibility and solubility. These latter low molecular weight polyamides include those which are unsuited generally for conversion into fiber-forming polyamides and also those which can be converted into fiber-forming polyamides by the application of further polymerization treatment. The above mentioned polyamides of the fiber-forming variety which as initially made are capable of being drawn into fibers or which have been made from the lower molecular weight non-fiber-forming polyamides, however, are not claimed specifically in this application since they are specifically claimed in the co-pending application Serial No. 136,031.

As many apparently widely different embodiments of this invention may be made without departing from the spirit and scope thereof, it is to be understood that I do not limit myself to the specific embodiments thereof except as defined in the appended claims.

I claim:

1. A process which comprises heating a member of the group consisting of dibasic carboxylic acids and their amide-forming derivatives with an organic diamine whose amino nitrogens carry at least one hydrogen atom and are attached to carbon atoms which are in turn attached to other atoms by single bonds only, the reactants being selected such that the sum of their radical lengths exceeds eight.

2. A process which comprises heating a member of the group consisting of dibasic carboxylic acids and their amide-forming derivatives with an aliphatic diamine whose amino nitrogens carry at least one hydrogen atom, the reactants being selected such that the sum of their radical lengths exceeds eight.

3. A linear polyamide having recurring structural units of unit length exceeding eight, the nitrogens in said polyamide being attached to aliphatic carbon atoms.

4. A linear polyamide having recurring structural units of unit length exceeding eight, said polyamide being the reaction product of an aliphatic diamine whose amino nitrogens carry at least one hydrogen atom and a member of the group consisting of dibasic carboxylic acids and their amide-forming derivatives.

5. A linear condensation polymer yielding, upon hydrolysis with strong mineral acid, a mixture comprising a diamine whose amino nitrogens are attached to carbon atoms which are in turn attached to other atoms by single bonds only and a dibasic carboxylic acid, the sum of whose radical lengths exceeds eight.

6. A linear polyamide yielding, upon hydrolysis with strong mineral acid, a diamine whose amino nitrogens are attached to carbon atoms which are in turn attached to other atoms by single bonds only and a dibasic aliphatic carboxylic acid, the sum of whose radical lengths exceeds eight.

7. A linear polyamide having recurring structural units of unit length exceeding eight, said units having the following general formula:

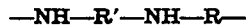

in which R' is a divalent hydrocarbon radical, the atoms in R' adjacent to nitrogen being carbon atoms attached to other atoms only by single bonds, and R is a diacyl radical.

8. A linear polyamide having recurring structural units of unit length exceeding eight, said units having the following general formula:

in which $x$ and $x'$ are monovalent hydrocarbon radicals whose atoms adjacent to nitrogen are carbon atoms joined in turn to other atoms only by single bonds, and R' is a divalent hydrocarbon radical whose atoms adjacent to nitrogen are carbon atoms joined in turn to other atoms only by single bonds, and R is a diacyl radical.

9. A linear polyamide obtainable by condensation polymerization from an acid of the formula $COOH(CH_2)_mCOOH$ and a diamine of the formula $NH_2(CH_2)_nNH_2$, $m$ and $n$ being integers whose sum is greater than four.

10. The process set forth in claim 2 in which the dibasic carboxylic acid is of the formula $COOH(CH_2)_mCOOH$ and the organic diamine is of the formula $NH_2(CH_2)_nNH_2$, $m$ and $n$ being integers whose sum is greater than four.

11. A linear polyamide yielding upon hydrolysis with strong mineral acids a dicarboxylic acid of the formula $HOOC(CH_2)_mCOOH$ and a diamine of formula $NH_2(CH_2)_nNH_2$ in which $m$ and $n$ are integers whose sum is greater than 4.

12. Polyhexamethylene adipamide.

13. Polydecamethylene adipamide.

14. A process which comprises heating at polymerizing temperature a member of the group consisting of dibasic carboxylic acids and their amide-forming derivatives with an organic diamine whose amino nitrogens carry at least one hydrogen atom and are attached to carbon atoms which are in turn attached to other atoms by single bonds only, the reactants being selected such that the sum of their radical lengths exceeds eight.

15. The process set forth in claim 14 in which the dibasic carboxylic acid is of the formula $COOH(CH_2)_mCOOH$ and the organic diamine is of the formula $NH_2(CH_2)_nNH_2$, $m$ and $n$ being integers whose sum is greater than four.

16. The process set forth in claim 14 in which said heating is at a temperature of 180° C. to 290° C.

17. Polyhexamethylene sebacamide.

18. A linear polyamide obtainable by condensation polymerization from at least one dibasic acid of the formula $COOH(CH_2)_mCOOH$ and at least two diamines of the formula $NH_2(CH_2)_nNH_2$, $m$ and $n$ being integers whose sum is greater than four.

19. A linear polyamide obtainable by condensation polymerization from at least two dibasic acids of the formula $COOH(CH_2)_mCOOH$ and at least one diamine of the formula $NH_2(CH_2)_nNH_2$, $m$ and $n$ being integers whose sum is greater than four.

20. The process set forth in claim 14 in which the dibasic carboxylic acid is adipic acid and in which the diamine is hexamethylenediamine.

WALLACE H. CAROTHERS.